(12) United States Patent
Serban

(10) Patent No.: US 12,104,513 B2
(45) Date of Patent: Oct. 1, 2024

(54) COMPACT EXHAUST GAS TREATMENT SYSTEM WITH SERVICEABLE FILTER

(71) Applicant: DINEX A/S, Middelfart (DK)

(72) Inventor: Alexandru Serban, Middelfart (DK)

(73) Assignee: DINEX A/S, Middelfart (DK)

( * ) Notice: Subject to any disclaimer, the term of this patent is extended or adjusted under 35 U.S.C. 154(b) by 0 days.

(21) Appl. No.: 18/262,442

(22) PCT Filed: Jan. 31, 2022

(86) PCT No.: PCT/EP2022/052191
§ 371 (c)(1),
(2) Date: Jul. 21, 2023

(87) PCT Pub. No.: WO2022/162212
PCT Pub. Date: Aug. 4, 2022

(65) Prior Publication Data
US 2024/0077012 A1    Mar. 7, 2024

(30) Foreign Application Priority Data
Feb. 1, 2021   (EA) .................................. 202190178

(51) Int. Cl.
*F01N 13/00* (2010.01)
*B01D 46/00* (2022.01)
(Continued)

(52) U.S. Cl.
CPC ..... *F01N 13/0097* (2014.06); *B01D 46/0027* (2013.01); *B01D 53/9431* (2013.01);
(Continued)

(58) Field of Classification Search
CPC .......... F01N 1/12; F01N 3/0211; F01N 3/033; F01N 3/0335; F01N 3/035; F01N 3/037;
(Continued)

(56) References Cited

U.S. PATENT DOCUMENTS 8,715,578 B2    5/2014  Fukuda
10,914,218 B1 *  2/2021  Chapman .............. F01N 3/2066
(Continued)

FOREIGN PATENT DOCUMENTS

EP    3412879 A1   12/2018
EP    3757361 A1   12/2020

OTHER PUBLICATIONS

International Search Report issued on May 2, 2022, in corresponding International Application No. PCT/EP2022/052191, 3 pages.

*Primary Examiner* — Binh Q Tran
(74) *Attorney, Agent, or Firm* — Maier & Maier, PLLC

(57) ABSTRACT

An exhaust gas treatment system comprising a first and a second structure being in fluid communication and defining a flow path of the exhaust gases, the second structure being supported by the first structure, the first structure comprising a first catalytic converter downstream a mixing chamber, the first catalytic converter having a fluid connection to an outlet of exhaust gases, the second structure including a filter unit housing removably connected to the first structure and to an inlet module by a filter unit housing fixing, the second structure defining a longitudinal axis, the filter unit housing including a filter unit, and the inlet module including a second catalytic converter and having a fluid connection to an inlet of exhaust gases, the filter unit housing and/or the inlet module being configured to allow its removal from the exhaust gas treatment system.

25 Claims, 8 Drawing Sheets

(51) Int. Cl.
  *B01D 53/94* (2006.01)
  *F01N 1/12* (2006.01)
  *F01N 3/021* (2006.01)
  *F01N 3/033* (2006.01)
  *F01N 3/035* (2006.01)
  *F01N 3/08* (2006.01)
  *F01N 3/10* (2006.01)
  *F01N 3/20* (2006.01)
  *F01N 3/28* (2006.01)
  *F01N 13/14* (2010.01)
  *F01N 13/18* (2010.01)

(52) U.S. Cl.
  CPC ....... *B01D 53/944* (2013.01); *B01D 53/9477* (2013.01); *F01N 3/0211* (2013.01); *F01N 3/035* (2013.01); *F01N 3/106* (2013.01); *F01N 3/2066* (2013.01); *F01N 3/2803* (2013.01); *F01N 3/2892* (2013.01); *F01N 13/14* (2013.01); *F01N 13/1805* (2013.01); *B01D 2259/4566* (2013.01); *B01D 2279/30* (2013.01); *F01N 1/12* (2013.01); *F01N 3/0335* (2013.01); *F01N 3/0814* (2013.01); *F01N 3/0821* (2013.01); *F01N 3/2882* (2013.01); *F01N 13/017* (2014.06); *F01N 2610/01* (2013.01); *F01N 2610/02* (2013.01); *F01N 2610/03* (2013.01)

(58) Field of Classification Search
  CPC .... F01N 3/0814; F01N 3/0821; F01N 3/0871; F01N 3/106; F01N 3/2066; F01N 3/2803; F01N 3/2882; F01N 3/2892; F01N 13/0097; F01N 13/017; F01N 13/14; F01N 13/1805; F01N 2610/01; F01N 2610/02; F01N 2610/03; F01N 2610/1453; B01D 46/0027; B01D 47/025; B01D 53/9431; B01D 53/944; B01D 53/9477; B01D 2259/4566; B01D 2279/30; B01D 2321/20; B01D 2321/2016; B01D 2321/2041
  See application file for complete search history.

(56) References Cited

U.S. PATENT DOCUMENTS

| | | | |
|---|---|---|---|
| 11,286,828 B1* | 3/2022 | Maganti | F01N 13/011 |
| 11,499,461 B2* | 11/2022 | Panunzio | B01F 25/4332 |
| 2010/0178215 A1* | 7/2010 | Honda | F01N 3/2066 |
| | | | 422/171 |
| 2011/0146252 A1* | 6/2011 | Silver | F01N 3/2073 |
| | | | 60/301 |
| 2013/0330237 A1* | 12/2013 | Lamps | F01N 13/18 |
| | | | 29/890 |
| 2016/0326931 A1* | 11/2016 | Freeman | F01N 3/2066 |
| 2017/0009628 A1* | 1/2017 | Kimura | F01N 3/103 |

* cited by examiner

COMPACT EXHAUST GAS TREATMENT SYSTEM WITH SERVICEABLE FILTER

FIELD

The present invention relates to an exhaust gas treatment system for exhaust gases of a combustion engine of a vehicle. Moreover, the present invention concerns a method for servicing the exhaust gas treatment system of the present invention. Furthermore, the present invention relates to a vehicle comprising the exhaust gas treatment system of the present invention. The present invention also concerns the use of the exhaust gas treatment system of the present invention for treating exhaust gases of a combustion engine of a vehicle.

BACKGROUND

The acceptable limits for exhaust emissions of vehicles are being reduced and thus, the introduction of filter elements and/or catalytic converters in the exhaust line of vehicles is necessary in order to meet the emissions regulations. Among other exhaust gas cleaning and filtering devices, the use of particulate filters, which reduce the particulate matter contained in the exhaust gases of a combustion engine, is increasing. Particulate matter accumulates within the filter element over time, and therefore the filter may need to be serviced or even replaced with a new one. Therefore it is important to provide an exhaust gas treatment system for exhaust gases of a combustion engine of a vehicle that can be easily serviced, avoids the risk of bypass of the exhaust gases and provides good leak tightness, while ensuring that the exhaust emissions are kept within the regulations.

Servicing a filter element of an exhaust gas treatment system usually requires removal of said filter element from the exhaust gas treatment system so that it can be properly cleaned or replaced. Therefore, it is important that the exhaust gas treatment system allows for easy removal of its filter device or filter unit.

Due to space constraints in modern vehicles, it is also important to achieve the above mentioned effects in a compact manner.

The present invention allows for easy and speedy service of a filter unit and/or of a catalytic element of an exhaust gas treatment system while taking all of the aforementioned concerns into careful consideration.

U.S. Pat. No. 8,707,687 B2 discloses an exhaust gas treatment system comprising a housing for being coupled to at least one frame rail of a vehicle and that comprises two diesel particulate filters located within the housing. The placement of two diesel particulate filters inside a housing hinders the servicing of said two filters.

EP 2110528 A1 discloses an apparatus for treating an exhaust gas stream which comprises a housing having a door which can be opened for rendering access to the interior of said housing during maintenance services. The placement of the gas treatment elements inside a housing, even if provided with a door, hinders the maintenance services.

U.S. Pat. No. 7,866,143 B2, U.S. Pat. No. 7,836,688 B2, U.S. Pat. No. 7,582,267 B1 and U.S. Pat. No. 7,550,024 B2 also belong to the background art concerning the claimed invention.

SUMMARY

The present invention has as an objective to contribute to solve many of the problems of the prior art exhaust gas treatment systems for exhaust gases of a combustion engine, while differentiating itself from existing exhaust gas treatment systems. The result is an exhaust gas treatment system that meets the functionality requirements, but also allows for easy service of its filter unit and/or at least one of its catalytic converters, and can be scaled to meet the requirements of different exhaust systems and/or different engines, while meeting the correspondent emissions regulations.

The present invention concerns a new exhaust gas treatment system which is a part of the exhaust system of a vehicle. In modern vehicles, typically, noxious exhaust gases and particulate matter out of the engine of a motor vehicle pass through a catalytic converter, such as an oxidation catalyst, and in particular, such as a Diesel Oxidation Catalyst (DOC) and/or a particulate filter, such as a Diesel Particulate Filter (DPF) and then into an exhaust mixing chamber. After the mixing chamber, exhaust gases may pass through a Selective Catalytic Reduction (SCR) catalyst which may be followed by an Ammonia Slip Catalyst (ASC).

Typically, in the mixing chamber aqueous urea solution is evaporated into a reductant, ammonia, and mixes reductant well with exhaust gas in a short distance. The mixing chamber aids in evaporation of aqueous urea droplets and homogenous mixing of evaporated ammonia into the exhaust gas, while minimizing risk of deposits. Homogeneously mixed ammonia in exhaust gas when also homogeneously distributed, with high flow uniformity, over Selective Catalytic Reduction SCR catalyst helps in achieving maximum conversion of harmful NOx to harmless nitrogen and water. In this respect, aqueous urea solution may be injected under pressure into the mixing system via a reductant dosing module to form a liquid spray which is allowed to fully evolve prior to impact with metal parts.

It is an object of the present invention to provide an exhaust gas treatment system for exhaust gases of a combustion engine of a vehicle comprising:
  an inlet of the exhaust gases, an outlet of the exhaust gases, a first and a second catalytic converter, a filter unit, a mixing chamber for evaporating liquid spray and subsequent mixing into the exhaust gases,
  wherein said exhaust gas treatment system comprises a first and a second structure being in fluid communication and defining a flow path of the exhaust gases, the second structure being supported by the first structure, the first structure comprising the first catalytic converter downstream the mixing chamber, said first catalytic converter having a fluid connection to the outlet of exhaust gases, the second structure comprising a filter unit housing removably connected to the first structure and to an inlet module by filter unit housing fixing means, said second structure defining a longitudinal axis, said filter unit housing comprising the filter unit, and said inlet module comprising the second catalytic converter and having a fluid connection to the inlet of exhaust gases, the filter unit housing and/or the inlet module being configured to allow its removal from the exhaust gas treatment system.

Due to the relative arrangement of the first and the second structure and their removable connection, the filter unit housing and/or the inlet module can be easily removed from the exhaust gas treatment system of the present invention. The easy removal of the filter unit housing and/or of the inlet module eases the service and/or replacement of said elements, including the filter unit located within the filter unit housing and the catalytic converter located within the inlet module. The arrangement of the components of the exhaust gas treatment device of the invention also eliminates the risk of internal bypass of the exhaust gases flowing through the exhaust gas treatment device.

In an embodiment, the filter unit housing and/or the inlet module are configured to allow its removal from the exhaust gas treatment system following a radial direction with respect to said longitudinal axis of the second structure. Alternatively, the filter unit housing and/or the inlet module are configured to allow its removal from the exhaust gas treatment system following an axial direction with respect to said longitudinal axis of the second structure. The filter unit housing and/or the inlet module may also be configured to allow its removal following a direction not being axial or radial with respect to said longitudinal axis of the second structure.

In a further embodiment, the first structure comprises a zone for receiving the second structure. Preferably, the zone for receiving the second structure comprises a protrusion, said protrusion being in contact with the second structure.

In a still further embodiment, the zone for receiving the second structure has a shape matching the one of the second structure.

In a still further embodiment, the first structure partially surrounds the second structure.

In a still further embodiment, the filter unit, the first catalytic converter and the second catalytic converter are arranged parallel to frame rail(s) of the vehicle. This arrangement eases the radial removal of the filter unit housing and/or the inlet module.

In a still further embodiment the second structure is supported by the first structure by means of a clamp or a strap or a bolt connection. However, any other suitable fixing means may be used to support the second structure by the first structure.

Besides providing fixation between elements, the filter unit fixing means also ensure the correct alignment between the filter unit housing and the inlet module, and, in particular, between the filter unit and the proximal end of the second catalytic converter located within the inlet module.

In a still further embodiment, the filter unit housing fixing means comprise V-clamps. V-clamps allow an easy and speedy removal of the filter unit housing and/or inlet module while providing leak tightness, which can be further increased by using one or more gaskets.

In a still further embodiment, the first structure comprises a first deflecting wall removably connected to the filter unit housing, said first deflecting wall being configured to enclose a first transfer cone, said first transfer cone being configured to deflect exhaust gases exiting the filter unit to the mixing chamber in a way such that the flow path of the exhaust gases in the mixing chamber is opposite to the one in the filter unit. Preferably, said first deflecting wall is also configured to deflect the exhaust gases exiting the first catalytic converter to the outlet pipe.

In a still further embodiment, the first structure comprises a second deflecting wall enclosing a second transfer cone configured to deflect exhaust gases exiting the mixing chamber to the first catalytic converter.

In a still further embodiment, the inlet of exhaust gases is arranged radially with respect to the flow path of the exhaust gases flowing through the second catalytic converter. Alternatively, the inlet of exhaust gases is arranged axially with respect to the flow path of the exhaust gases flowing through the second catalytic converter.

In a still further embodiment, the outlet of exhaust gases is arranged radially with respect to the flow path of the exhaust gases flowing through the first catalytic converter. Alternatively, the outlet of exhaust gases is arranged axially with respect to the flow path of the exhaust gases flowing through the first catalytic converter.

A radial or axial inlet of exhaust gases can be combined with a radial or axial outlet of exhaust gases. In a still further embodiment, the inlet and/or the outlet of the exhaust gases do not follow an axial or radial direction.

In a still further embodiment, the exhaust gas treatment system of the invention comprises a cover of the first structure and/or of the second structure. Preferably, said cover is insulated, preferably, with a heat shield. Preferably, said cover comprises a service hatch, so that a technician or similar can have access to the elements located within said cover for service or any other reason.

In a still further embodiment, the exhaust gas treatment system of the invention further comprises a third catalytic converter upstream of the second catalytic converter. This embodiment is particularly advantageous for treating the exhaust gases of vehicles having to meet the most strict emissions regulations, such as, for example, the so called Euro 7/VII. Said third catalytic converter can be located within the inlet module, in particular, upstream of the second catalytic converter and downstream of the inlet of exhaust gases, or it can be located outside the inlet module as, or in a, separate module. In the latter case, said separate module has its own inlet of exhaust gases coming from the combustion engine of a vehicle. Preferably, the third catalytic converter comprises a Selective Catalytic Reduction (SCR) catalyst. More preferably, the third catalytic converter further comprises an Ammonia Slip Catalyst (ASC) arranged downstream said Selective Catalytic Reduction (SCR) catalyst.

In a still further embodiment, the second catalytic converter comprises a Diesel Oxidation Catalyst (DOC).

In a still further embodiment, the filter unit comprises a Diesel Particulate Filter (DPF).

In a still further embodiment, the first catalytic converter comprises a first Selective Catalytic Reduction (SCR) catalyst. Preferably, first catalytic converter further comprises a first Ammonia Slip Catalyst (ASC) arranged downstream said first Selective Catalytic Reduction (SCR) catalyst and defining a first catalytic flow path.

In a still further embodiment, the first catalytic converter further comprises a second Selective Catalytic Reduction (SCR) catalyst and a second Ammonia Slip Catalyst (ASC) arranged downstream said second Selective Catalytic Reduction catalyst and defining a second catalytic flow path, wherein the second deflecting wall is further configured to distribute the flow of exhaust gases coming from the mixing chamber to the first and second catalytic flow paths.

The exhaust gas treatment system of the invention is preferably made of stainless steel, which is resistant to urea corrosion, has a low thermal expansion and has a good formability and weldability. However, other materials having similar properties can also be used.

In a second aspect the present invention relates to a method of servicing an exhaust gas treatment system of the present invention as well as any one of the above embodiments comprising the following steps:
  Loose the filter unit housing fixing means,
  Move the inlet module away from the filter unit housing in an axial direction with respect to the longitudinal axis of the second structure,
  Move the filter unit housing away from the exhaust gas treatment system.

In a further embodiment of the second aspect, the filter unit housing is moved away from the exhaust gas treatment system following a radial direction with respect to the longitudinal axis of the second structure. Alternatively, the filter unit housing is moved away from the exhaust gas treatment system following an axial direction with respect to the longitudinal axis of the second structure.

In a still further embodiment of the second aspect, the method also comprises the step of cleaning or replacing the filter unit.

In a third aspect the present invention relates to a vehicle comprising an exhaust gas after treatment system of the present invention as well as any one of the above embodiments.

In a fourth aspect the present invention relates to the use of at least one exhaust gas after treatment system for treating exhaust gases of a combustion engine of a vehicle.

Further objects and advantages of the present invention will appear from the following description, and claims.

DETAILED DESCRIPTION

There are many advantages of the present invention in a broad context as well as even more advantageous aspects of the embodiments.

The device and system according to the present invention will now be described in more detail with regard to the accompanying FIGS. 1-8. The figures show one way of implementing the present invention and is not to be construed as being limiting the present invention in any way.

The material to be used can be stainless steel, which has low thermal expansion, is urea corrosion resistant and has good formability and weldability. However, other suitable materials can be used.

Figure 1:
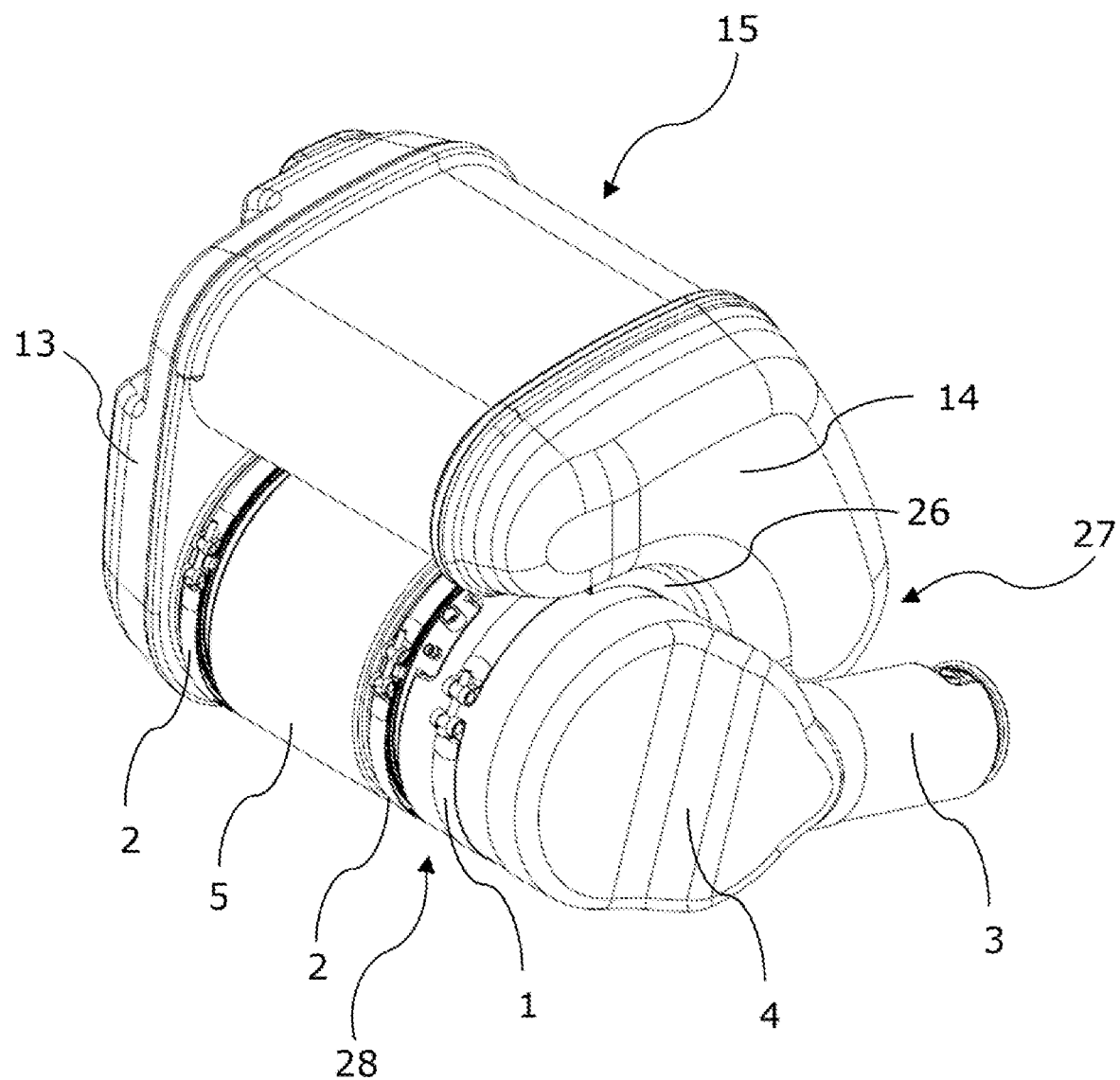
FIG. 1 is a front perspective view of an embodiment of an exhaust gas treatment system for exhaust gases of a combustion engine of a vehicle according to the present invention.

FIG. 1 shows a front perspective view of an embodiment of an exhaust gas treatment system (15) for exhaust gases of a combustion engine of a vehicle according to the invention. In this figure can be seen a secondary or second structure (28) comprising a filter unit housing (5) and an inlet module (4), which comprises an inlet pipe (3) of exhaust gases coming from a combustion engine of a vehicle. In this figure it is also depicted a primary or first structure (27) that, among others, comprise a first deflecting wall (13), a second deflecting wall (14) and a protrusion (26) together with a band (1).

In the embodiment shown in FIG. 1, the protrusion (26) of the first structure (27) is configured to be in contact with the second structure (28), and in particular, with the inlet module (4), so that said first and second structures (27, 28) are properly placed and aligned. In this embodiment, the band (1) aids in providing support to the second structure (28) by the first structure (27). Said second structure (28) is also supported by the first structure (27) by means of the connection between the filter unit housing (5) and the first deflecting wall (13). In this exemplary embodiment, the connection between the filter unit housing (5) and the first deflecting wall (13) and the inlet module (4) is made using V-clamps (2), which ensure alignment between said elements and provide great leak tightness while allowing easy and speedy disconnection, or connection, of said elements.

In the exemplary embodiment shown, the first structure (27) partially surrounds the second structure (28). This provides a compact solution and also reduces the heat loss of the exhaust gas treatment system (15).

The arrangement shown of the first and second structures (27, 28) in a saddle like arrangement provides for a compact exhaust gas treatment system (15) which eliminates the risk of internal bypass and allows for an easy and speedy service of the filter unit (19) (see FIGS. 3 and 4) located within the filter unit housing (5) and/or of the inlet module (4), among others.

Figure 2:
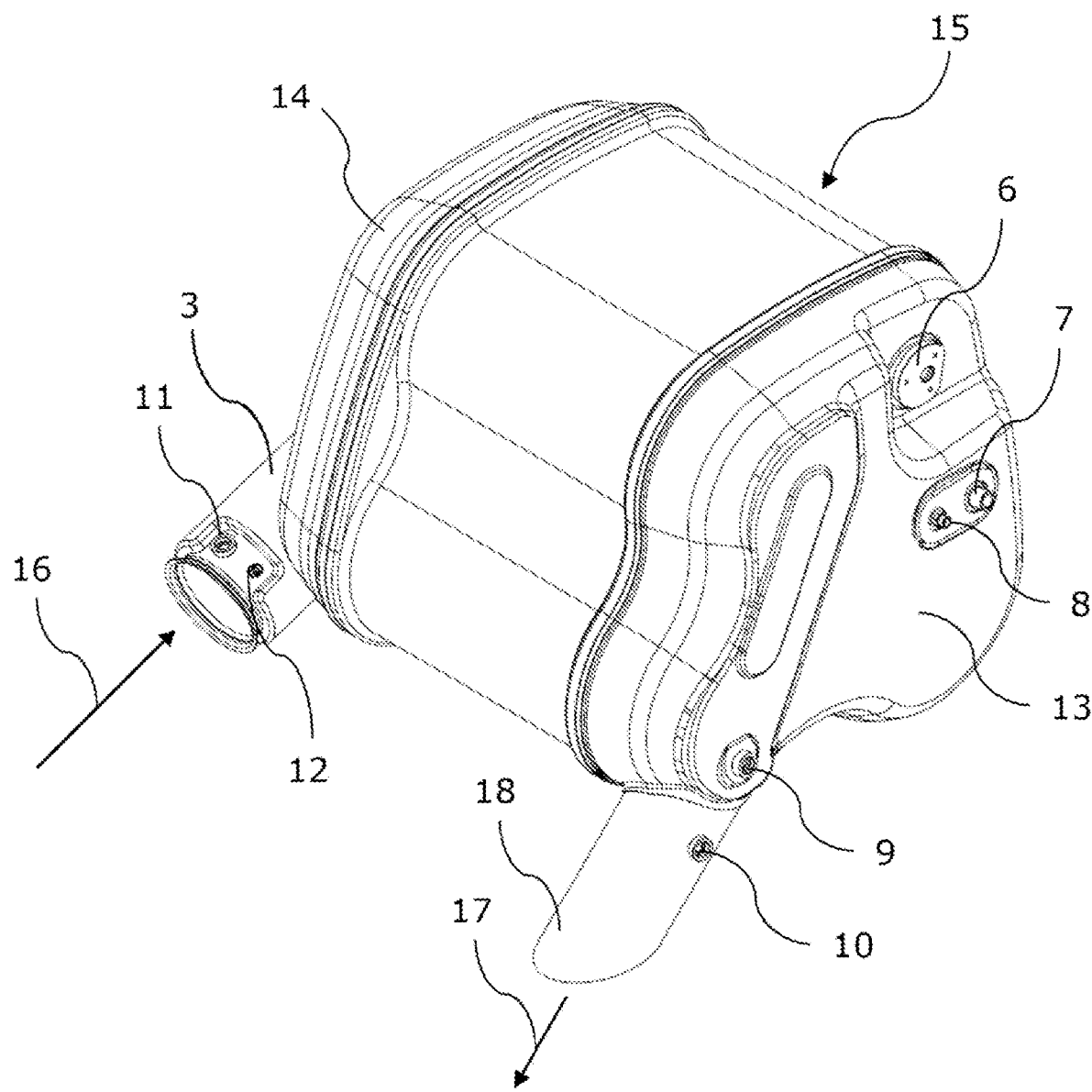
FIG. 2 is a rear perspective view of the embodiment of an exhaust gas treatment system shown in FIG. 1.

FIG. 2 shows a rear perspective view of the embodiment of an exhaust gas treatment system shown in FIG. 1, wherein an arrow (16) indicates the flow direction of the exhaust gases coming from the combustion engine at the inlet pipe (3) and an arrow (17) indicates the flow direction of exhaust gases exiting the exhaust gas treatment system (15) at an outlet pipe (18). In this exemplary embodiment, the inlet pipe (3) is provided with a Nitrogen Oxides (NOx) sensor boss (11) and a temperature sensor boss (12), so that the quality of the exhaust gases at the inlet of the exhaust gas treatment system (15) can be monitored. Likewise, in this exemplary embodiment, the outlet pipe (18) is provided with a Particulate Matter (PM) sensor boss (10) and the first deflecting wall (13) near its connection with the outlet pipe (18) is provided with a NOx sensor boss (9), so that the quality of the exhaust gases at the outlet of the exhaust gas treatment system (15) can also be monitored. In other embodiments, other arrangements of the above mentioned sensor bosses are possible, for example, the NOx sensor boss (9) can also be placed at the outlet pipe (18).

The first deflecting wall (13) and/or the second deflecting wall (14) can also be provided with further instrumentation. In particular, the first deflecting wall (13) of the exemplary embodiment shown is also provided with a pressure sensor boss (7) and a temperature sensor boss (8) to measure the exhaust gases flowing through the exhaust gas treatment system (15). In this exemplary embodiment, the first deflecting wall (13) is also provided with a dosing unit mounting (6) for housing a dosing module or a pressure atomizer (not shown) to insert a liquid, such as an aqueous urea solution, and in particular urea water solution, into the exhaust gases flowing through the mixing chamber (23) (see FIGS. 6 and 7), where it subsequently evaporates to form gaseous ammonia. This instrumentation is optional and may vary between embodiments. Further instrumentation can be placed in other elements or places of the exhaust gas treatment system of the present invention. Other embodiments of the exhaust gas treatment system of the present invention can have less instrumentation than the one described hereinabove.

Figure 3:
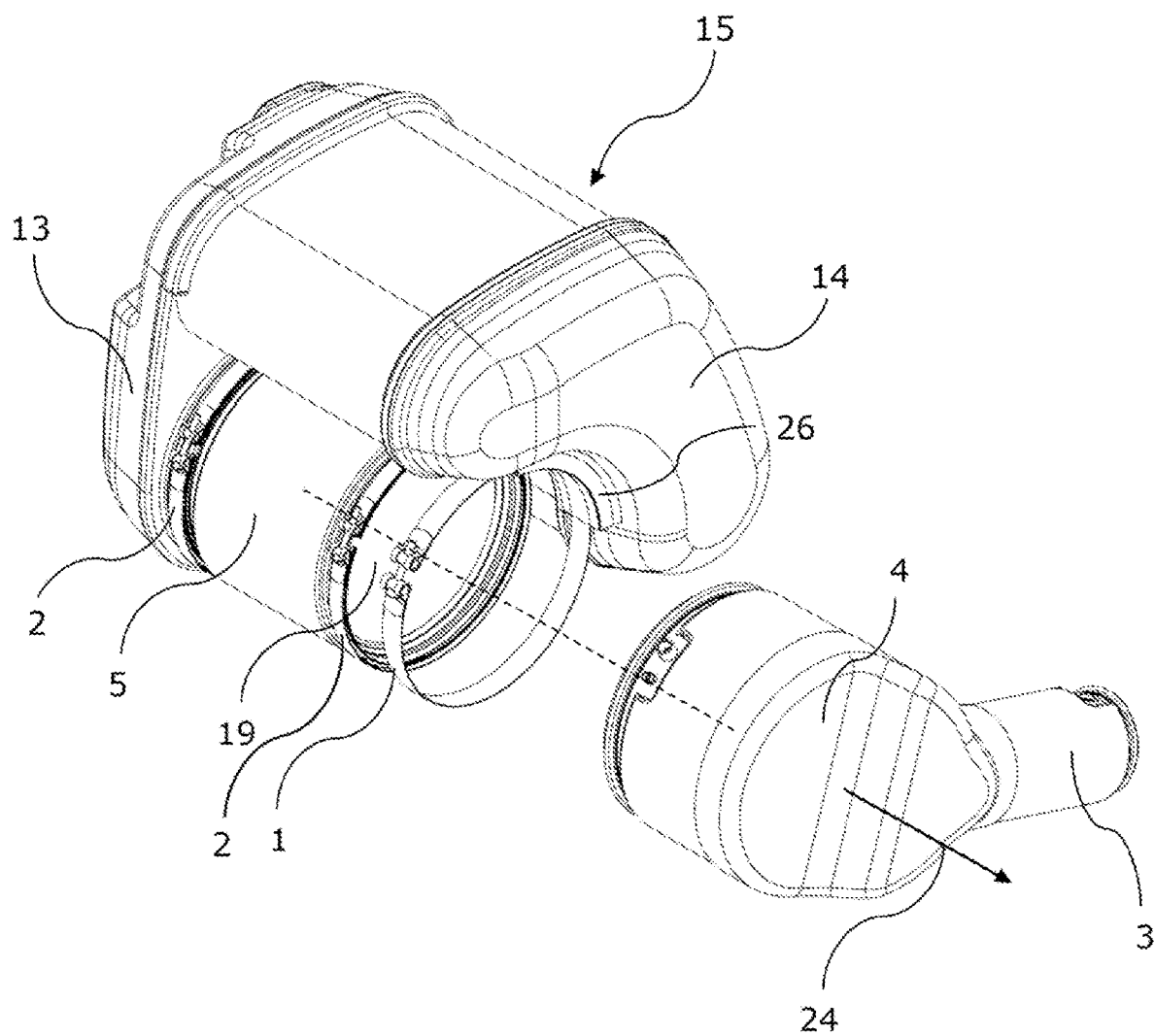
FIG. 3 is a front perspective view of the embodiment of an exhaust gas treatment system shown in FIG. 1 with its inlet module exploded.

FIG. 3 shows a front perspective view of the embodiment of an exhaust gas treatment system shown in FIG. 1 with its inlet module exploded. In this view is also depicted the longitudinal axis defined by the second structure, which defines an axial direction (24) of removal of the inlet module (4). This can be achieved by loosening the band (1) and the V-clamp (2) located in the connection between the outlet of the inlet module (4) and the inlet of the filter unit housing (5). In order to axially remove the inlet module (4), the inlet pipe (3) of the exhaust gas treatment system (15) may also need to be disconnected from the upstream branch of the exhaust system of the vehicle (not shown). However, it is also possible that the connection between the inlet pipe (3) and the upstream branch of the exhaust system of the vehicle, or the upstream branch itself, allows sufficient axial displacement of the inlet module (4) without loosening, untightening, uncoupling, etc. said connection.

Once the inlet module (4) is removed or extracted from the exhaust gas treatment system (15) the filter unit (19) located within the filter unit housing (5) is exposed. In the case of the exemplary embodiment shown, said filter unit (19) is a Diesel Particulate Filter (DPF), but it could also be a Gasoline Particulate Filter (GPF).

In this exemplary embodiment, the inlet pipe (3) and the outlet pipe (18) (see FIG. 1) are arranged radially with respect to the longitudinal axis of the second structure (28). However, in other embodiments the inlet pipe (3) and the outlet pipe (18) can be arranged axially with respect to said longitudinal axis of the second structure (28). Other embodiments may have an inlet pipe (3) arranged radially and an outlet pipe (18) arranged axially, or vice versa.

Figure 4:
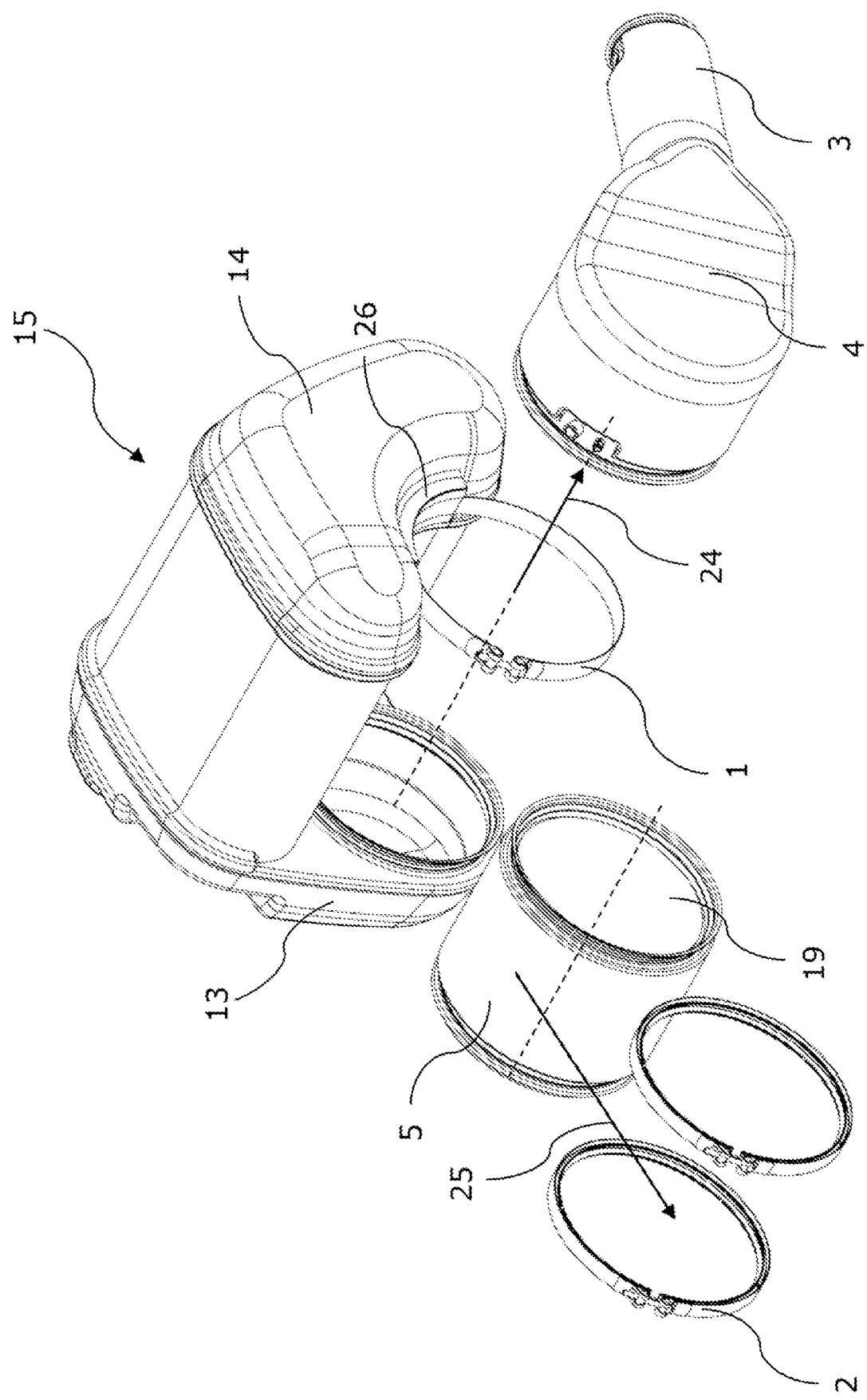
FIG. 4 is a front perspective view of the embodiment of an exhaust gas treatment system shown in FIG. 1 with its filter unit housing and its inlet module exploded.

FIG. 4 shows a front perspective view of the embodiment of an exhaust gas treatment system shown in FIG. 1 with its filter unit housing and its inlet module exploded. In this figure, after the extraction of the inlet module (4) following an axial direction (24) with respect to the longitudinal axis defined by the second structure, the filter unit housing (5) is extracted or removed from the exhaust gas treatment system (15) following a radial direction (25) with respect to said longitudinal axis defined of the second structure. In order to be extracted in such a way, in the exemplary embodiment shown, it is necessary to loosen the V-clamp (2) of the connection between the outlet of the filter unit housing (5) and the inlet of the first deflecting wall (13).

It should be noted that in the exemplary embodiment shown in FIG. 4 the filter unit housing (5) can also be extracted or removed from the exhaust gas treatment system (15) following an axial direction (24). In this case, the filter unit housing (5) passes through the band (1). The axial removal of the filter unit housing (5) becomes easier if it is done together with the inlet module (4), that is to say, the process begins by loosening the V-clamp (2) located in the connection between the inlet of the first deflecting wall (13) and the outlet of the filter unit housing (5). Once this is completed, the second structure (28) (see FIG. 1), i.e., the filter unit housing (5) and the inlet module (4), can be extracted following an axial direction (24) in a similar way to what is shown in FIG. 3 with regard to the inlet module (4). The result of this step can be seen in FIG. 5. After the extraction of the second structure (28) (see FIG. 1), the V-clamp (2) of the connection between the inlet of the filter unit housing (5) and the outlet of the inlet module (4) can be loosened, if necessary, so that the filter unit housing (5), or its filter unit (19), and/or the inlet module (4) can easily be serviced or replaced.

Figure 5:
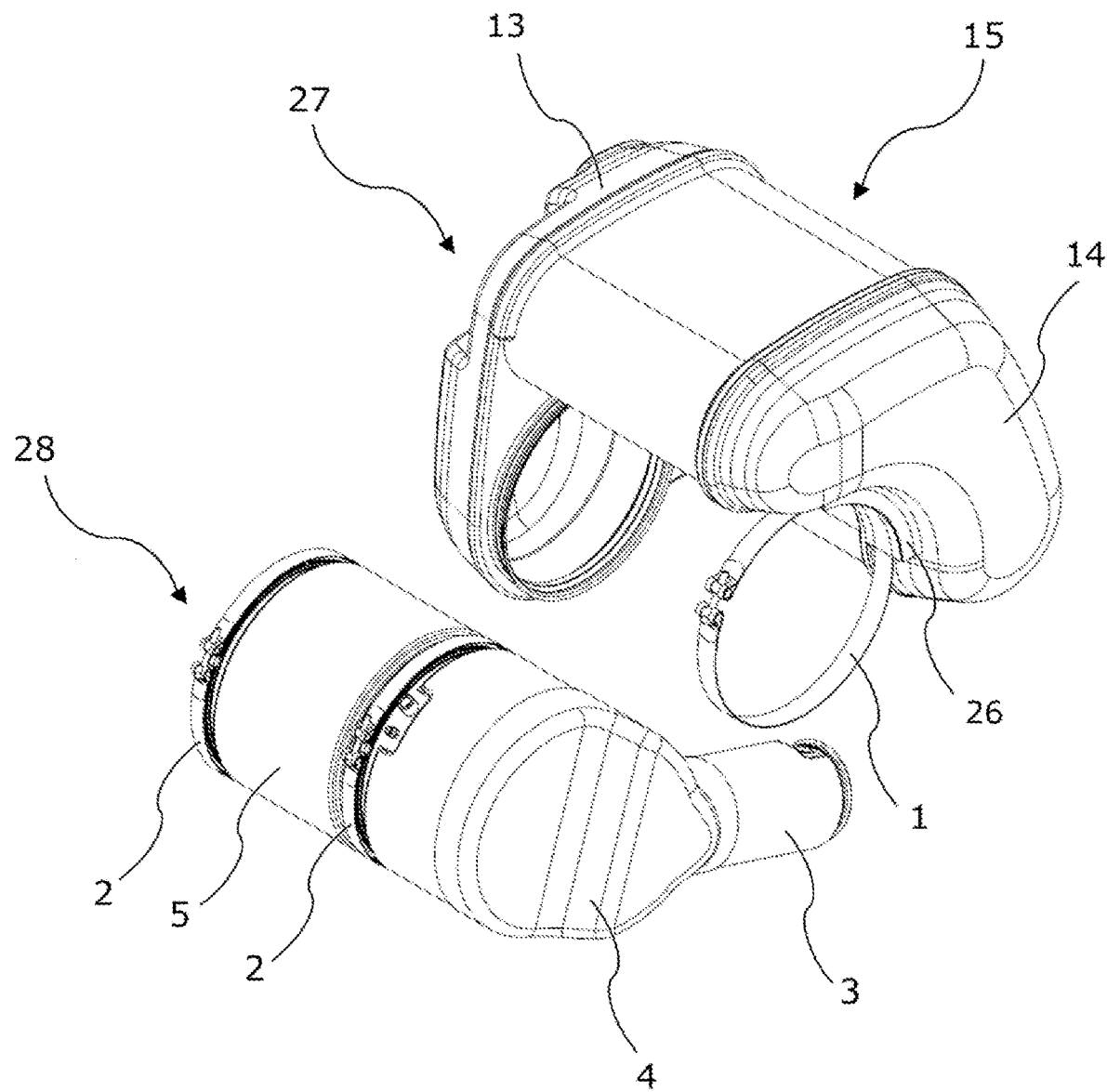
FIG. 5 is a front perspective view of the embodiment of an exhaust gas treatment system shown in FIG. 1 with its second structure disconnected from the first structure.

FIG. 5 shows a front perspective view of the embodiment of an exhaust gas treatment system shown in FIG. 1 with its second structure detached from the first structure. This figure clearly illustrates the possibility of extracting the secondary or second structure (28) from the primary or first structure (27), as described previously. The protrusion (26) and the band (1) which helps to provide the saddle like arrangement of the exhaust gas treatment system (15) of this embodiment can also be seen in this figure.

Figure 6:
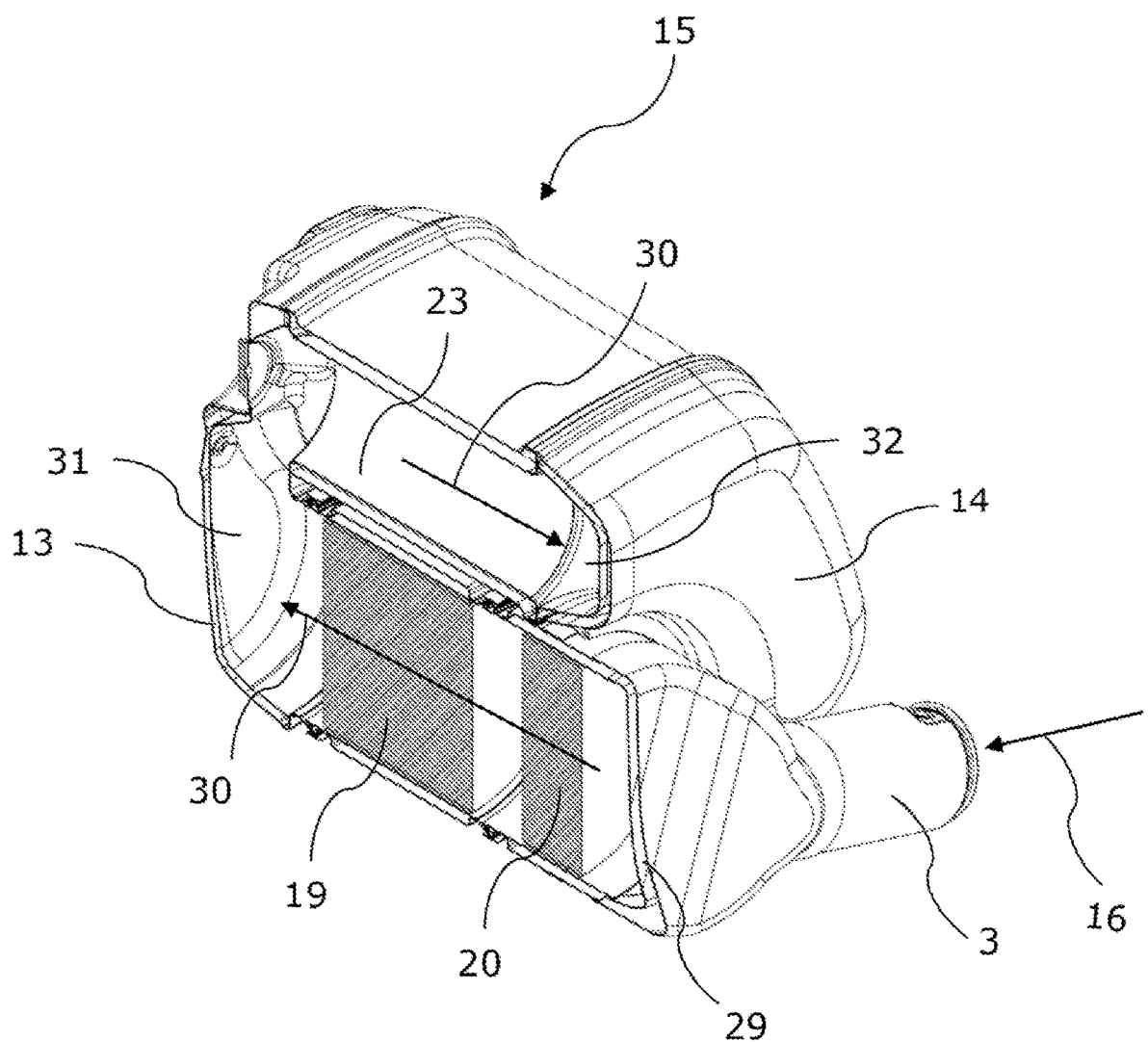
FIG. 6 is a sectioned front perspective view of the embodiment of an exhaust gas treatment system shown in FIG. 1.

FIG. 6 shows a sectioned front perspective view of the embodiment of an exhaust gas treatment system shown in FIG. 1. In this sectioned view the flow of exhaust gases flowing through the exhaust gas treatment system (15) is depicted with arrows (30). Exhaust gases enter the exhaust gas treatment system (15) through the inlet pipe in a radial direction (16) with respect to the longitudinal axis of the second structure (28) (see FIGS. 3 and 4). An inlet cone (29) of the inlet module (4) deflects the exhaust gases entering the exhaust gas treatment system (15) through the inlet pipe (3) to the second catalytic converter, which in this case, is a Diesel Oxidation Catalyst (DOC) (20). After flowing through the DOC (20) the exhaust gases flow through the filter unit (19). Following the filter unit (19), the exhaust gases find the first deflecting wall (13) and a first transfer cone (31), which is enclosed by said first deflecting wall (13), deflects the exhaust gases exiting the filter unit (19), and in particular, the DPF, to the mixing chamber (23) in such a way that the flow path (30) of the gases in the mixing chamber (23) is opposite to the direction of the flow path (30) of the exhaust gases in the filter unit (19). After exiting the mixing chamber (23) the exhaust gases are directed to a first catalytic converter by a second transfer cone (32) enclosed by the second deflecting wall (14).

Figure 7:
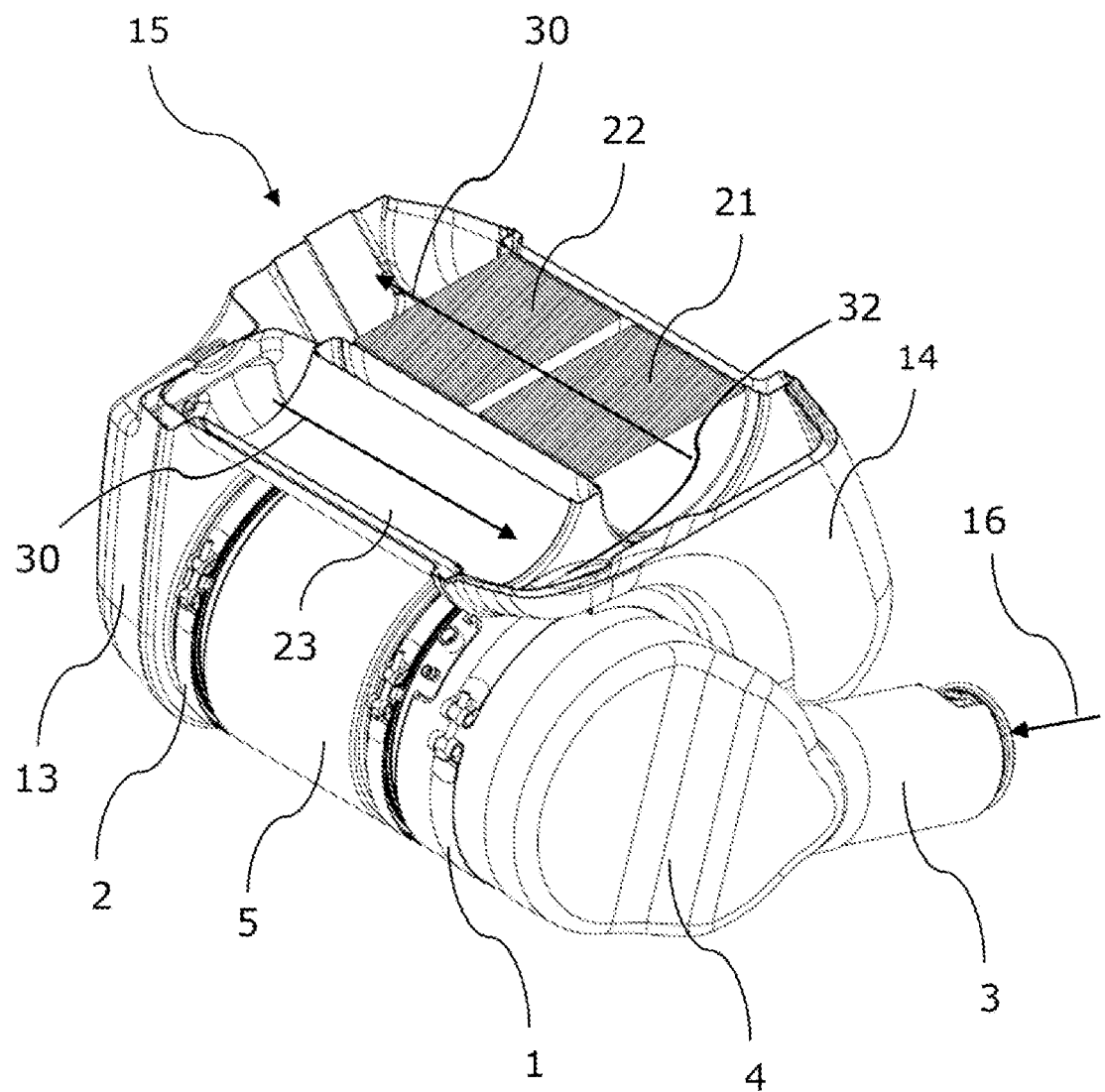
FIG. 7 is a sectioned front perspective view of the embodiment of an exhaust gas treatment system shown in FIG. 1.

FIG. 7 shows a sectioned front perspective view of the embodiment of an exhaust gas treatment system shown in FIG. 1. This view shows the flow path (30) of the exhaust gases in the mixing chamber (23) and in the first catalytic converter after being deflected by the second transfer cone (32) located at the second deflecting wall (14). In the exemplary embodiment shown, the first catalytic converter located in the first structure comprises a first Selective Catalytic Reduction (SCR) catalyst (21) which is followed by a first Ammonia Slip Catalyst (ASC) (22).

Figure 8:
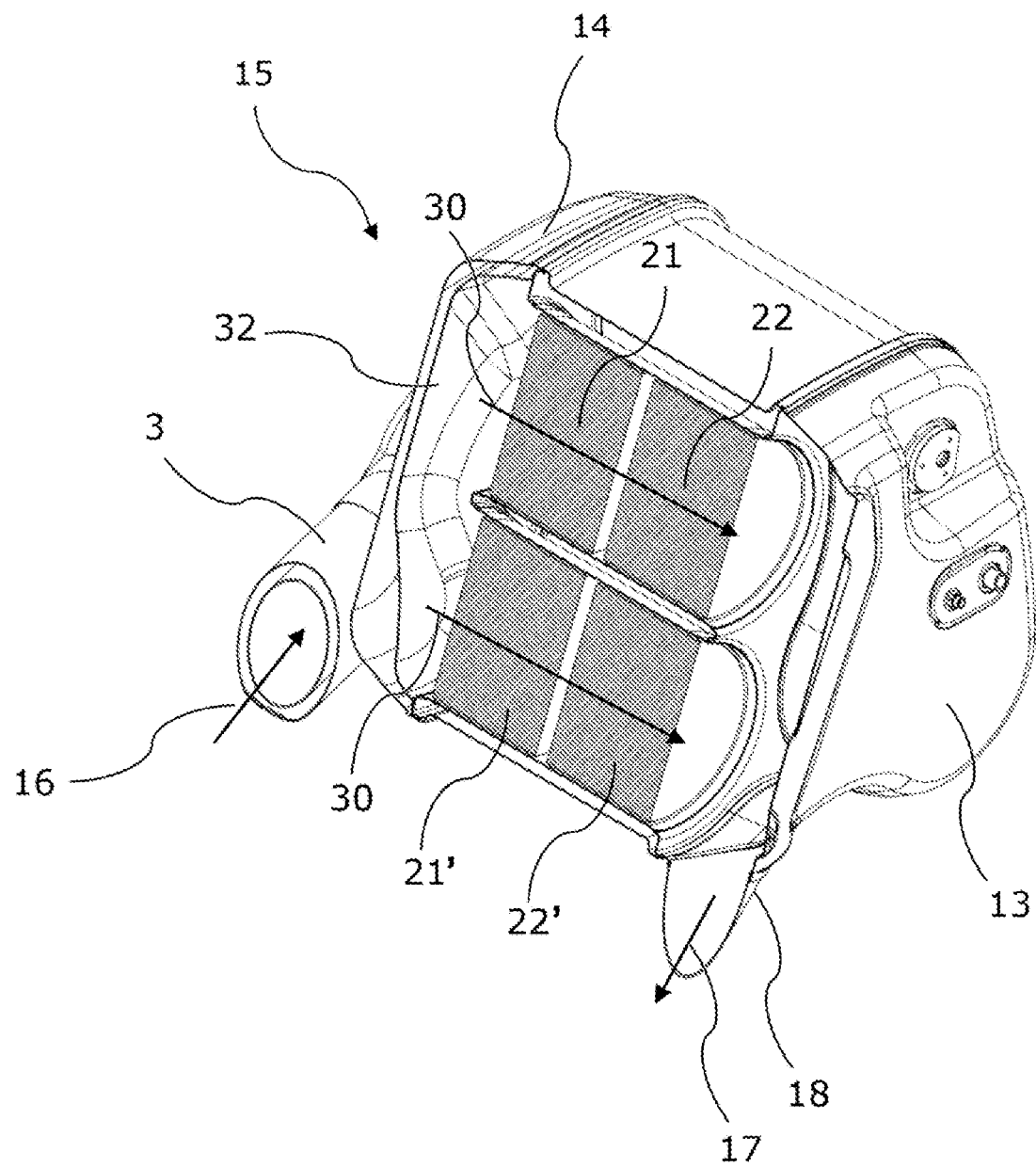
FIG. 8 is a sectioned rear perspective view of the embodiment of an exhaust gas treatment system shown in FIG. 1.

FIG. 8 shows a sectioned rear perspective view of the embodiment of an exhaust gas treatment system shown in FIG. 1. This figure shows that the first catalytic converter of the exemplary embodiment shown, further to the first SCR catalyst (21) and first ASC (22) described above also comprises a second SCR catalyst (21') and a second ASC (22') located downstream said second SCR catalyst (21'). In such an embodiment, the first SCR catalyst (21) and the first ASC (22) define a first catalytic flow path, while the second SCR catalyst (21') and the second ASC (22') define a second catalytic flow path. If the exhaust gas treatment system (15) comprises more than one catalytic flow path, as in the case of the embodiment shown, the second transfer cone (32) of the second deflecting wall (14) is also configured to divide the flow of exhaust gases into each catalytic flow path. Once the exhaust gases exit its correspondent catalytic flow path are directed to the outlet pipe (18) and exit the exhaust gas treatment system (15).

Although the exemplary embodiment shown in the figures comprises two catalytic flow paths in the primary or first structure (27), other embodiments can comprise only one catalytic flow path or more than two.

In the exemplary embodiment shown in the previously described figures, the filter unit (19), the DOC (20), the first and second SCR catalyst (21, 21') and the first and second ASC (22, 22') are arranged parallel with the frame rail(s) of the vehicle equipped with the exhaust gas treatment system (15) of the present invention. The connection between the different elements described above and the frame rail(s) of the vehicle provide a structurally rigid link between the second structure (28) and the vehicle frame.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

Recitation of ranges of values herein are merely intended to serve as a short method of referring individually to each separate value falling within the range, unless other-wise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about", where appropriate).

All methods described herein can be performed in any suitable order unless otherwise indicated herein or otherwise clearly contradicted by context.

The terms "a" and "an" and "the" and similar referents as used in the context of describing the invention are to be construed to insert both the singular and the plural, unless otherwise indicated herein or clearly contradicted by context. Thus, "a" and "an" and "the" may mean at least one, or one or more.

The term "and/or" as used herein is intended to mean both alternatives as well as each of the alternatives individually. For instance, expression "xxx and/or yyy" means "the xxx and yyy; the xxx; or the yyy", all three alternatives are subject to individual embodiments.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The features disclosed in the foregoing description may, both separately and in any combination thereof, be material for realizing the invention in diverse forms thereof.

I claim:

1. An exhaust gas treatment system for exhaust gases of a combustion engine of a vehicle, comprising:
    an inlet of the exhaust gases,
    an outlet of the exhaust gases,
    a first catalytic converter and a second catalytic converter,
    a filter unit,
    a mixing chamber for evaporating liquid spray and subsequent mixing into the exhaust gases,
    wherein the exhaust gas treatment system comprises a first structure and a second structure being in fluid communication and defining a flow path of the exhaust gases, the second structure being supported by the first structure,
    the first structure comprising the first catalytic converter downstream the mixing chamber, said first catalytic converter having a fluid connection to the outlet of exhaust gases,
    the second structure comprising a filter unit housing removably connected to the first structure and to an inlet module by filter unit housing fixing means, and the inlet module removably connected to the first structure and the filter unit housing,
    said second structure defining a longitudinal axis,
    said filter unit housing comprising the filter unit, and
    said inlet module comprising the second catalytic converter and having a fluid connection to the inlet of exhaust gases,
    the filter unit housing and/or the inlet module being configured to allow its removal from the exhaust gas treatment system.

2. The exhaust gas treatment system, according to claim 1, wherein the filter unit housing and/or the inlet module are configured to allow its removal from the exhaust gas treatment system following a radial direction with respect to said longitudinal axis of the second structure.

3. The exhaust gas treatment system, according to claim 1, wherein the first structure comprises a zone for receiving the second structure.

4. The exhaust gas treatment system, according to claim 3, wherein the zone for receiving the second structure comprises a protrusion, said protrusion being in contact with the second structure.

5. The exhaust gas treatment system, according to claim 3, wherein the zone for receiving the second structure has a shape matching the one of the second structure.

6. The exhaust gas treatment system, according to claim 3, wherein the first structure partially surrounds the second structure.

7. The exhaust gas treatment system, according to claim 1, wherein the filter unit, the first catalytic converter and the second catalytic converter are arranged parallel to frame rail(s) of the vehicle.

8. The exhaust gas treatment system, according to claim 1, wherein the second structure is supported by the first structure by a clamp or a strap or a bolt connection.

9. The exhaust gas treatment system, according to claim 1, wherein the filter unit housing fixing comprise V-clamps.

10. The exhaust gas treatment system, according to claim 1, wherein the first structure comprises a first deflecting wall removably connected to the filter unit housing, said first deflecting wall being configured to enclose a first transfer cone, said first transfer cone being configured to deflect exhaust gases exiting the filter unit to the mixing chamber in a way such that the flow path of the exhaust gases in the mixing chamber is opposite to the one in the filter unit.

11. The exhaust gas treatment system, according to claim 1, wherein the first structure comprises a second deflecting wall enclosing a second transfer cone configured to deflect exhaust gases exiting the mixing chamber to the first catalytic converter.

12. The exhaust gas after treatment system, according to claim 1, wherein the inlet of exhaust gases is arranged radially with respect to the flow path of the exhaust gases flowing through the second catalytic converter.

13. The exhaust gas after treatment system, according to claim 1, wherein the inlet of exhaust gases is arranged axially with respect to the flow path of the exhaust gases flowing through the second catalytic converter.

14. The exhaust gas treatment system, according to claim 1, wherein the outlet of exhaust gases is arranged radially with respect to the flow path of the exhaust gases flowing through the first catalytic converter.

15. The exhaust gas treatment system, according to claim 1, wherein the outlet of exhaust gases is arranged axially with respect to the flow path of the exhaust gases flowing through the first catalytic converter.

16. The exhaust gas treatment system, according to claim 1, further comprising a cover of the first structure and/or of the second structure.

17. The exhaust gas treatment system, according to claim 16, wherein said cover is insulated.

18. The exhaust gas treatment system, according to claim 16, wherein said cover comprises a service hatch.

19. The exhaust gas treatment system, according to claim 1, further comprising a third catalytic converter upstream of the second catalytic converter.

20. The exhaust gas treatment system, according to claim 19, wherein the third catalytic converter comprises a Selective Catalytic Reduction (SCR) catalyst.

21. The exhaust gas treatment system, according to claim 1, wherein the second catalytic converter comprises a Diesel Oxidation Catalyst (DOC).

22. The exhaust gas treatment system, according to claim 1, wherein the filter unit comprises a Diesel Particulate Filter (DPF).

23. The exhaust gas treatment system, according to claim 1, wherein the first catalytic converter comprises a first Selective Catalytic Reduction (SCR) catalyst.

24. The exhaust gas treatment system, according to claim 1, wherein the first catalytic converter further comprises a first Ammonia Slip Catalyst (ASC) arranged downstream said first Selective Catalytic Reduction (SCR) catalyst and defining a first catalytic flow path.

25. The exhaust gas treatment system, according to claim 11, wherein the first catalytic converter further comprises a second Selective Catalytic Reduction (SCR) catalyst and a second Ammonia Slip Catalyst (ASC) arranged downstream said second Selective Catalytic Reduction (SCR) catalyst and defining a second catalytic flow path, and wherein the second deflecting wall is further configured to distribute the flow of exhaust gases coming from the mixing chamber to the first and second catalytic flow paths.

* * * * *